UNITED STATES PATENT OFFICE.

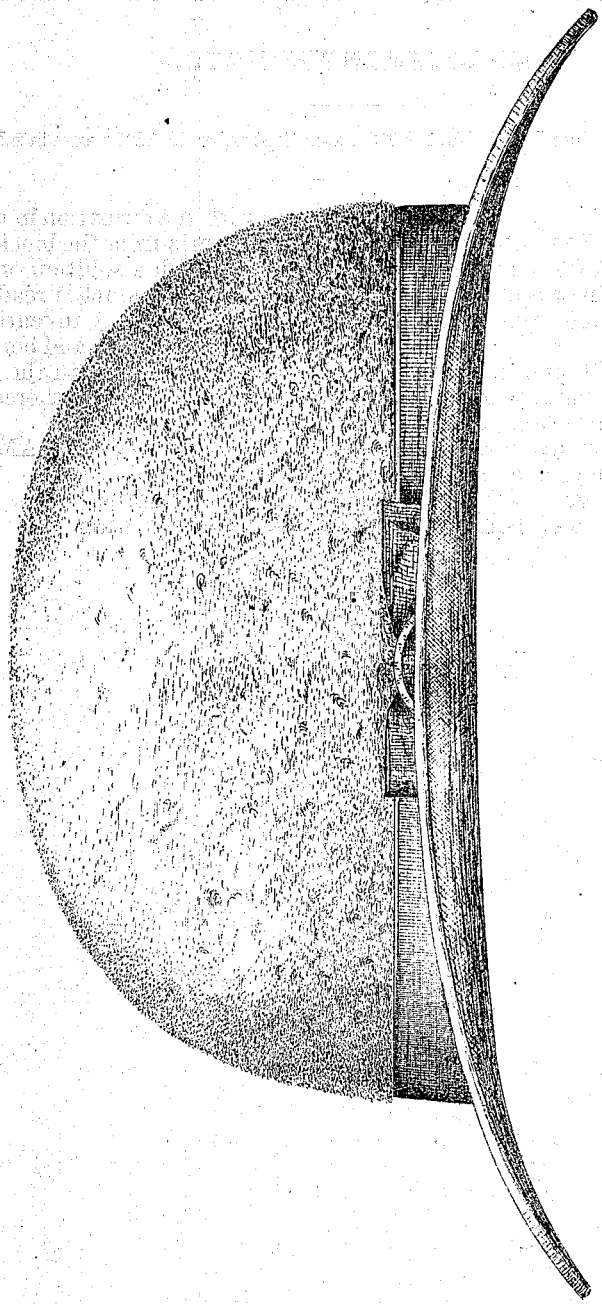

ABRAM BOGARDUS, OF MATTEAWAN, NEW YORK.

IMPROVEMENT IN HATS.

Specification forming part of Letters Patent No. 119,073, dated September 19, 1871; antedated September 9, 1871.

*To all whom it may concern:*

Be it known that I, ABRAM BOGARDUS, of Matteawan, in the county of Dutchess and State of New York, have invented a new and Improved Hat, Cap, and Bonnet, the description whereof is as follows:

Take the skin of any animal tanned in the usual way, with the wool, hair, or natural growth remaining thereon. Cut the same in a circular form; shear down the natural growth upon the skin to any required length; place the same upon an ordinary hat-block, such as is generally used for forming seamless hats, caps, and bonnets, and proceed with the formation in the usual way. Remove the fabric from the block; coat over the inside surface with a solution of gum-shellac, and the hat, cap, or bonnet is ready for trimming.

What I claim as my invention is—

A seamless hat, cap, and bonnet made from the skins of any animal, with the wool, hair, or natural growth remaining thereon, tanned in the usual way.

ABRAM BOGARDUS.

Witnesses:
E. S. PHILLIPS,
C. W. TOMPKINS.